June 14, 1966 P. M. PASQUIER 3,255,720
BLOCK AND STRINGER TYPE LIFT TRUCK PALLET
Filed Dec. 11, 1964
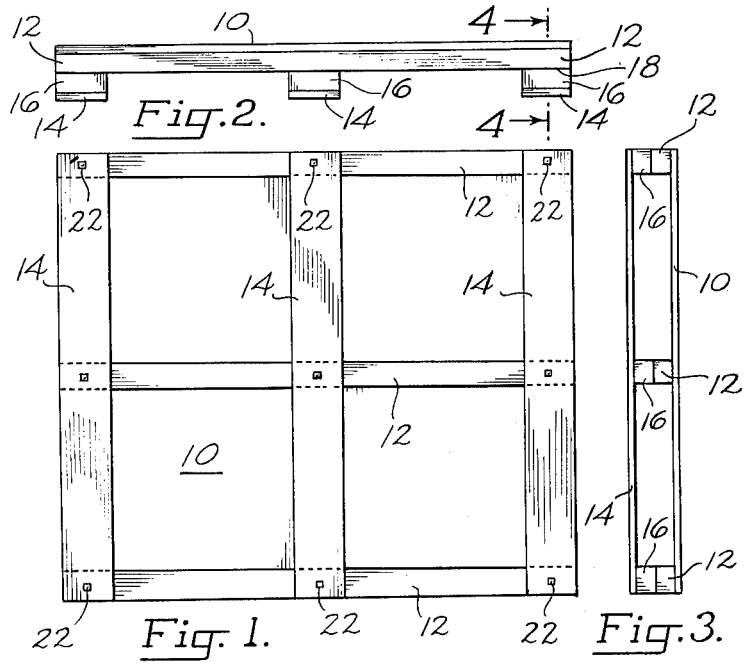
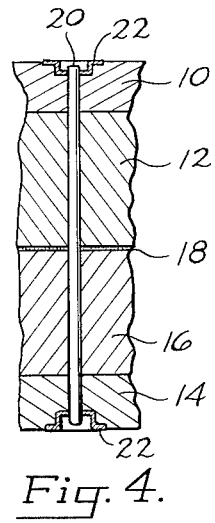
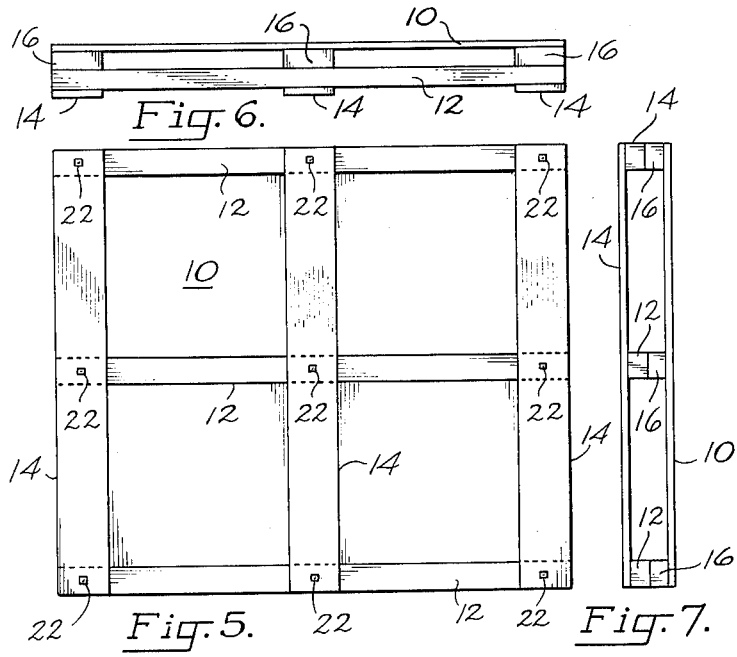
Pierre Michel Pasquier
INVENTOR.
BY Eugene O. Farley
Atty.

United States Patent Office 3,255,720
Patented June 14, 1966

3,255,720
BLOCK AND STRINGER TYPE LIFT
TRUCK PALLET
Pierre Michel Pasquier, Sumner, Wash., assignor to Pasquier Panel Products, Sumner, Wash., a corporation of Washington
Filed Dec. 11, 1964, Ser. No. 417,656
4 Claims. (Cl. 108—51)

This invention relates to lift truck pallets.

The conventional 4-way entry wooden pallet comprises a lumber or plywood deck nailed to 2 x 4 stringers which have been cut away to afford access to the forks of a lift truck. Such pallets necessarily are structurally weak and subject to damage upon use. Furthermore, the nails come loose, project through the deck and damage the lading carried on the pallets. In addition, the pallets often are made on a piece work basis by laboriously nailing the parts together and accordingly are relatively expensive. Still further, the cut out portions of the 2 x 4 stringers represent a substantial waste of wood.

It is the general purpose of the present invention to provide a novel lift truck pallet which is strong, which has a long service life, and which can be manufactured easily and inexpensively in a single-stage, assembly line operation.

It is a further object of the present invention to provide a lift truck pallet which is economical in its construction in that it is made from small pieces of lumber assembled together, rather than from larger pieces from which portions must be cut out, with attendant waste of wood.

Still a further object of the present invention is the provision of a lift truck pallet having a pallet surface which is free from loose nails and other projections which might damage the superimposed load.

The manner of accomplishing the foregoing and other objects of this invention will be apparent from the accompanying specification and claims, considered together with the drawings, wherein:

FIGS. 1, 2 and 3 are bottom plan, front edge and side edge views respectively of the presently described pallet;

FIG. 4 is a fragmentary, sectional view, taken along line 4—4 of FIG. 2; and

FIGS. 5, 6 and 7 are bottom plan, front edge and side edge views, respectively, of the presently described pallet in a second embodiment.

In the form of the invention illustrated in FIGS. 1-4, the pallet of the invention includes a top plate 10 made preferably of plywood and having the desired load-bearing surface area.

Immediately below top plate 10 are positioned a plurality of stringers 12 arranged in parallel spaced relation. In a pallet of average size, there conveniently may be three stringers placed one at each edge and one in the middle. The stringers may be of selected dimension lumber, as, for example, lengths of 2 x 2 lumber.

Lapping stringers 12 are a plurality of runners 14. These are arranged substantially at right angles to the stringers and conveniently may comprise strips of plywood cut to the desired width and arranged two along the side edges of the pallet and one in the middle.

The runners may vary in width according to the application of the pallet and the inclinations of the user. Thus, in a typical pallet all of the runners may be 5 inches in width. In another typical pallet, the outside runners may be 5 or 6 inches in width, and the middle runner from 12 to 18 inches in width.

To define the lift truck fork entry openings there are provided a plurality of spacer blocks 16. These may comprise 2 x 2 wood pieces cut to a length equal to the width of the runners and either underlying or overlying the stringers.

In the embodiment of FIGS. 1-4 the spacer blocks underlie stringers 12 to which they are glued by a layer of adhesive 18.

There thus is provided a lapped assembly including plate 10, stringers 12, spacer blocks 16 and runners 14, in the order named. This assembly may be secured together by the application of suitable fasteners, in particular by the application of hollow rivets or of the special fasteners illustrated in FIG. 4.

In the application of the latter fasteners, the lapped assembly first is drilled to form an opening dimensioned to receive a pin 20 which may comprise, for example, a length of wire of quarter inch diameter. The pin is inserted in the opening, after which friction-grip, press-on clip fasteners 22 are pressed on the respective ends of the pin toward the surfaces of top plate 10 and runner 14. As the fasteners are advanced along the pin, they countersink themselves into the surfaces of the adjacent structural members so that a special countersinking operation is not necessary. Furthermore, the outer surfaces of the fasteners lie substantially flush with the outer surfaces of the structural members which they fasten together so that a smooth surface is presented which will not mar a load placed upon the pallet.

The pallet illustrated in FIGS. 5-7 inclusive is similar to that above described, with the exception that the relative positions of the stringer and spacer block members are interchanged. This may be desirable when the pallets are used with certain types of loads and certain categories of lift trucks.

In this form of the invention top plate 10 overlies spacer blocks 16 which are glued to stringers 12. The latter, in turn, are positioned in overlapped, right angled relation to runners 14. This places the lift truck fork openings directly beneath the under surface of face plate 10, rather than underneath stringers 12.

The entire lapped assembly then may be fastened together by the application of press-on, friction-grip clip fasteners 22 to pins 20, as described previously.

In either case, the pallet lends itself readily to one step assembly line production. This may be accomplished by assembling the components in their lapped relation and with the glue applied to the surfaces of spacer block 10 adjacent stringers 12. The assembly then may be drilled at the points of lapping, pins 20 inserted in the drilled openings, and friction-grip, press-on clip fasteners may be applied simultaneously at all locations in a special press provided for the purpose. This not only secures together all the components, but also clamps the glued members so that the adhesive sets and performs its normal function without the application of special presses.

The pallet thus produced has several functional advantages.

It is ideally dimensioned for use as four-way entry pallet.

It has a box-beam construction which renders is extremely strong.

The plate or deck surface is smooth and remains smooth during use, since there are no nails which can work loose.

It is easily repaired, since when it is subjected to rupturing shock, the only result is to pull clip fasteners 22 of pins 20, separating the members so that they do not shatter. The pallet then may be rebuilt merely by inserting new pins and pressing on new clip fasteners.

Wood is not wasted in its construction, since it is not necessary to cut away portions in order to provide lift truck fork entry openings.

All of these advantages are obtained, furthermore, in a pallet which may be mass produced at relatively low cost.

It is to be understood that the form of my invention herein shown and described is to be taken as a preferred example of the same and that various changes in the shape, size and arrangement of parts may be restorted to without departing from the spirit of my invention or the scope of the subjoined claims.

Having thus described my invention, I claim:

1. A lift truck pallet comprising
   (a) a one piece top plate defining a continuous load supporting plane surface,
   (b) a plurality of elongated narrow stringers arranged in parallel, spaced relation on the underside of the plate,
   (c) a plurality of elongated narrow runners arranged in parallel, spaced relation substantially at right angles to the stringers on the underside thereof,
   (d) a plurality of spacer blocks arranged in alignment with the runners at spaced intervals between the runners and the top plate, defining lift truck fork openings in the sides of the pallet,
   (e) the top plate, stringers, runners, and spacer blocks being in lapped relation to each other, and
   (f) at each point of said lapping, a pin penetrating the plate, the lapped stringers, runners, and spacer blocks and having secured to each of its opposite ends of friction-grip press-on clip fastener.

2. The lift truck pallet of claim 1 wherein the spacer blocks underlap the stringers.

3. The lift truck pallet of claim 1 wherein the spacer blocks overlap the stringers.

4. The lift truck pallet of claim 1 wherein the spacer blocks are glued to the stringers.

References Cited by the Examiner

UNITED STATES PATENTS

| | | | |
|---|---|---|---|
| 2,448,447 | 8/1948 | Lau | 108—51 |
| 2,783,960 | 3/1957 | Herz et al. | 108—56 |
| 3,090,331 | 5/1963 | McCann | 108—51 |

FOREIGN PATENTS

| | | |
|---|---|---|
| 567,438 | 5/1958 | Belgium. |
| 786,409 | 11/1957 | Great Britain. |
| 907,946 | 10/1962 | Great Britain. |
| 181,182 | 10/1962 | Sweden. |

FRANK B. SHERRY, *Primary Examiner.*

G. O. FINCH, *Assistant Examiner.*